United States Patent [19]

Su

[11] Patent Number: 6,043,976
[45] Date of Patent: Mar. 28, 2000

[54] DOCKING BASE FOR A PORTABLE COMPUTER

[75] Inventor: Fei-Mi Su, Chang-Hua Hsien, Taiwan

[73] Assignee: Universal Scientific Industrial Co., Ltd., Taiwan, Taiwan

[21] Appl. No.: 08/997,246

[22] Filed: Dec. 23, 1997

[30] Foreign Application Priority Data

Oct. 24, 1997 [TW] Taiwan ................................ 86218041

[51] Int. Cl.⁷ ...................................................... G06F 1/16
[52] U.S. Cl. ............................ 361/686; D14/107; 381/87
[58] Field of Search ....................... 361/686, 683;
395/281–283; D14/107, 113, 114; 381/87,
89, 300, 306, 37, 333, 334, 361, 365, 366,
386, 388, 387

[56] References Cited

U.S. PATENT DOCUMENTS

| D. 364,151 | 11/1995 | Yamazaki | D14/107 |
|---|---|---|---|
| D. 375,945 | 11/1996 | Shin et al. | D14/107 |
| 5,604,663 | 2/1997 | Shin et al. | 361/686 |
| 5,825,614 | 10/1998 | Kim | 361/683 |
| 5,847,922 | 12/1998 | Smith et al. | 361/686 |
| 5,852,545 | 12/1998 | Pan-Ratzlaff | 361/683 |
| 5,880,928 | 3/1999 | Ma | 361/683 |

Primary Examiner—Leo P. Picard
Assistant Examiner—Lisa Lea-Edmonds
Attorney, Agent, or Firm—Christensen, O'Connor, Johnson & Kindness PLLC

[57] ABSTRACT

A docking base incorporates a speaker unit that includes a speaker casing having a back wall, two opposed lateral walls extending respectively from two opposed lateral edge portions of the back wall, a bottom wall extending between the lateral walls, and a front wall which defines a sound outlet therethrough. The docking base includes an elongated docking frame which has an elongated horizontal portion with left and right ends, and an upright portion which is disposed generally perpendicular to and which divides the horizontal portion into a front section to support a portable computer thereon and a rear section to support the bottom wall of the speaker casing thereon. The upright portion has front and rear walls respectively adjacent to the front and rear sections. One of the lateral edge portions of the speaker casing is coupled pivotally with the rear section along an axis longitudinal to the upright portion and proximate to one of the left and right ends so as to turn the speaker casing about the longitudinal axis between a retracted position and an extended position. At the retracted position, the back wall of the speaker casing confronts the rear wall of the upright portion. At the extended position, the lateral walls of the speaker casing are exposed outwardly of a respective one of the left and right ends to direct the sound outlet to face frontward.

3 Claims, 7 Drawing Sheets

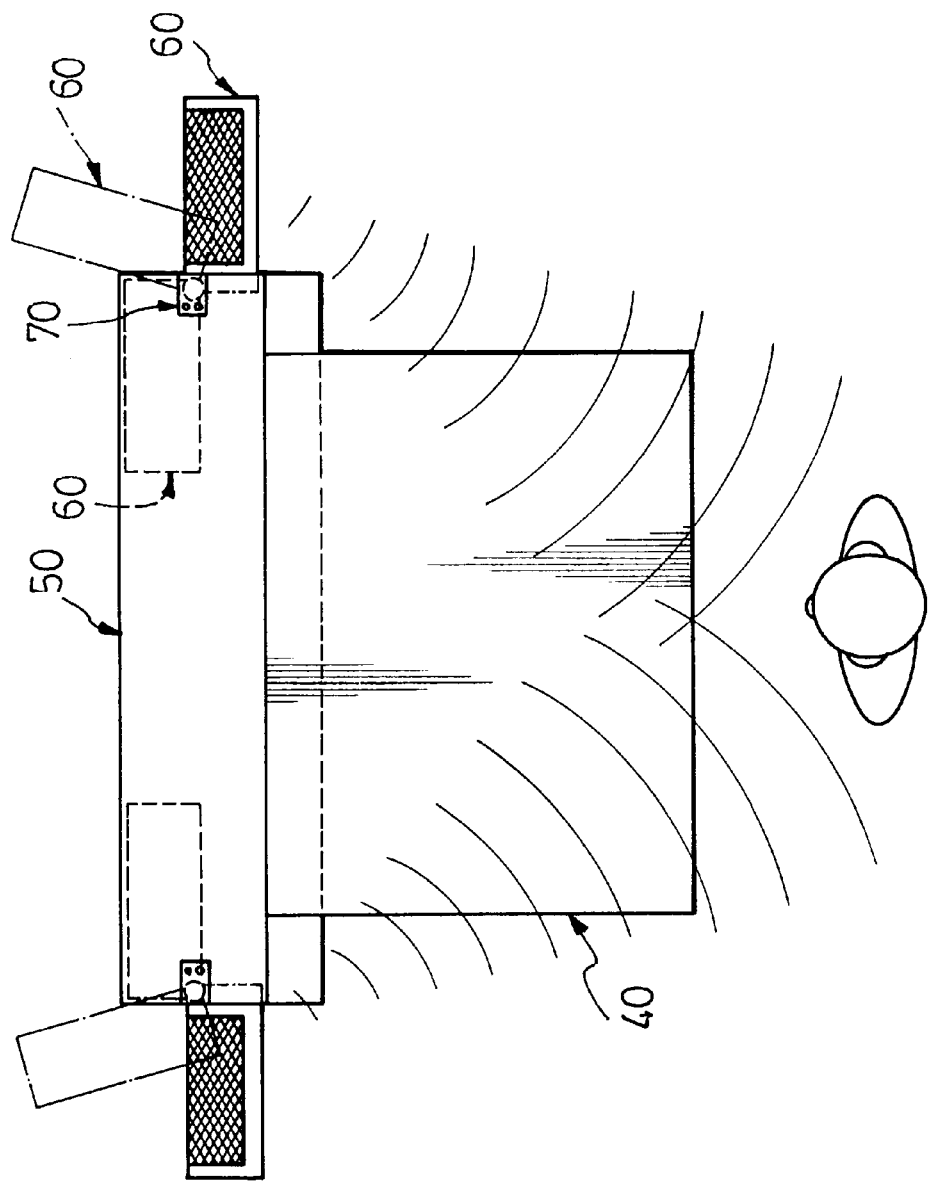

6,043,976

DOCKING BASE FOR A PORTABLE COMPUTER

BACKGROUND OF THE INVENTION

1. Field of the Invention

The invention relates to a docking base, more particularly to a docking base that is suitable for use with a portable computer and that has a speaker unit incorporated therein.

2. Description of the Related Art

A docking base is an extension device which facilitates connection of a portable computer to different computer peripheral devices, e.g. printers, scanners, speaker units etc. Since the various computer peripheral devices that are installed are connected to the docking base, there is no need to disconnect the portable computer from the computer peripheral devices. Instead, the portable computer can be simply detached from the docking base when is it desired to bring the portable computer to another location.

At present, most portable computers have speaker units built therein. Referring to FIGS. 1 and 2, a known docking base is shown to include a step-shaped frame 21 having a shallow front portion 21A adapted to accommodate a portable computer 20 thereon, and a tall rear portion 21B in which a speaker unit 10 is installed such that the sound outlets are oriented upwardly (FIG. 1) and laterally (FIG. 2) relative to the front portion 21A.

Referring to FIG. 3, another known docking base 21 is shown which has the similar structure as that of FIGS. 1 and 2, except in the sound outlets of the speaker unit 10 are oriented rearwardly relative to the front portion 21A upon which a portable computer 20 can be mounted.

Note that the sound effect provided thereby is not satisfactory due to the limited sizes of the same. Since the positions of the speaker units 10 on the known docking base 21 are fixed, and are not directed to the user, an optimum sound effect cannot be achieved.

SUMMARY OF THE INVENTION

The object of this invention is to provide a docking base which incorporates adjustable speaker units for optimum sound effect.

Accordingly, the docking base of this invention incorporates a speaker unit that includes a speaker casing having a back wall, two opposed lateral walls extending respectively from two opposed lateral edge portions of the rear wall, a bottom wall extending between the lateral walls, and a front wall which defines a sound outlet therethrough. The docking base includes an elongated docking frame which has an elongated horizontal portion with left and right ends, and an upright portion which is disposed generally perpendicular to, and divides the horizontal portion into a front section to support a portable computer thereon and a rear section to support the bottom wall of the speaker casing thereon. The upright portion has front and rear walls respectively adjacent to the front and rear sections. The docking frame further includes means for pivotally coupling one of the lateral edge portions of the speaker casing with the rear section along an axis longitudinal to the upright portion and proximate to one of the left and right ends so as to turn the speaker casing about the longitudinal axis between a retracted position and an extended position. At the retracted position, the back wall of the speaker casing confronts the rear wall of the upright portion. At the extended position, the lateral walls of the speaker casing are exposed outwardly of a respective one of the left and right ends to direct the sound outlet to face frontward.

BRIEF DESCRIPTION OF THE DRAWINGS

Other features and advantages of this invention will become more apparent in the following detailed description of the preferred embodiment with reference to the accompanying drawings, in which:

FIG. 8 illustrates different positions of the speaker unit on the preferred embodiment.

DETAILED DESCRIPTION OF THE PREFERRED EMBODIMENT

Figure 5:
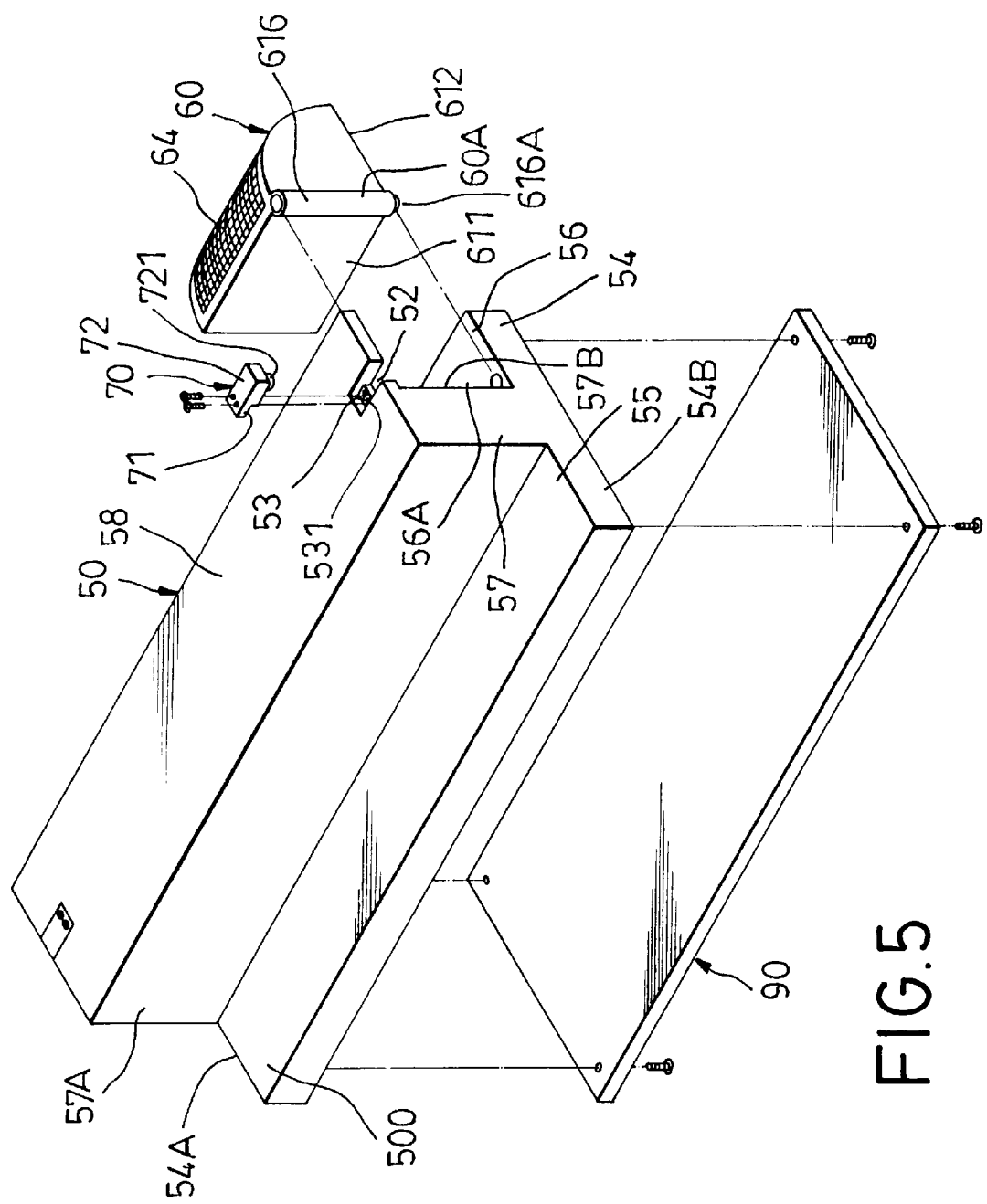
FIG. 5 is an exploded perspective view of the preferred embodiment.

Referring to FIGS. 5, 6, 7 and 8, the preferred embodiment of a docking base 50 for a portable computer 40 of this invention is shown to include a speaker units 60 (only one is shown in FIG. 5).

As illustrated, each of the speaker units 60 includes a speaker casing with a back wall 611, two opposed lateral walls 612 which extend respectively from two opposed lateral edge portions 611A of the back wall 611, a bottom wall 613 which extends between the lateral walls 612, and a front wall 614 which defines a sound outlet 615 therethrough.

Figure 1:
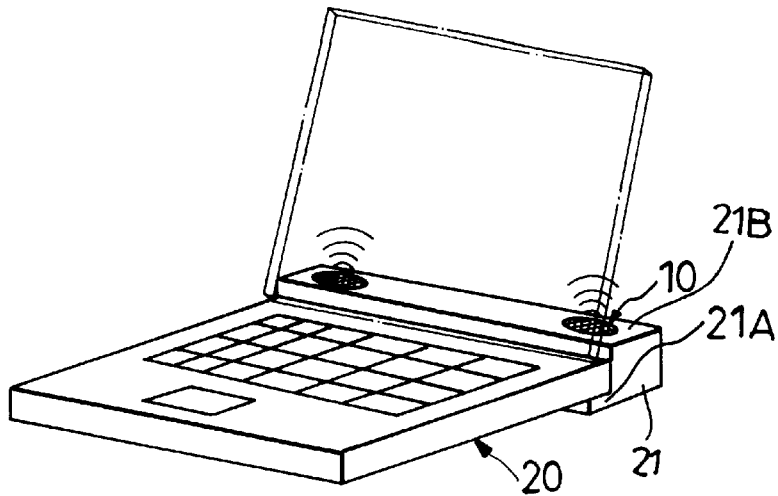
FIG. 1 is a pictorial view of a portable computer with a first type of docking base known to the prior art.
Figure 2:
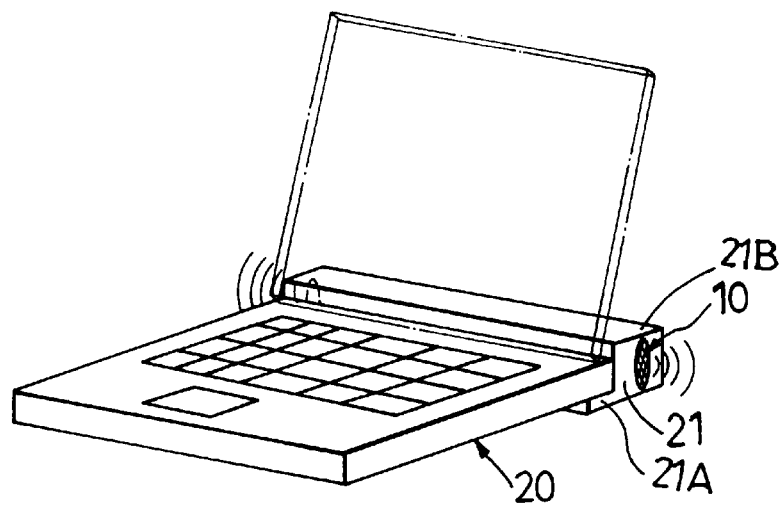
FIG. 2 is a pictorial view of a portable computer with a second type of docking base known to the prior art.
Figure 3:
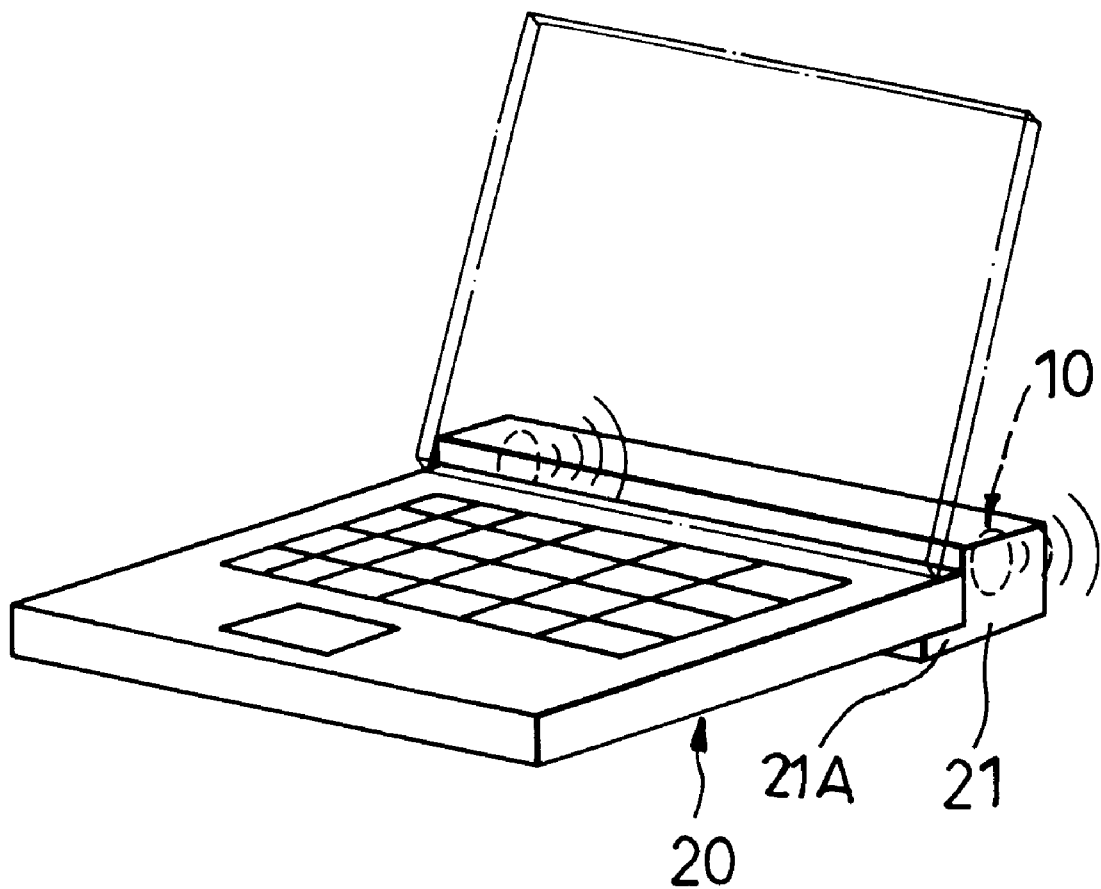
FIG. 3 is a pictorial view of a computer with a third type of docking base known to the prior art.
Figure 4:
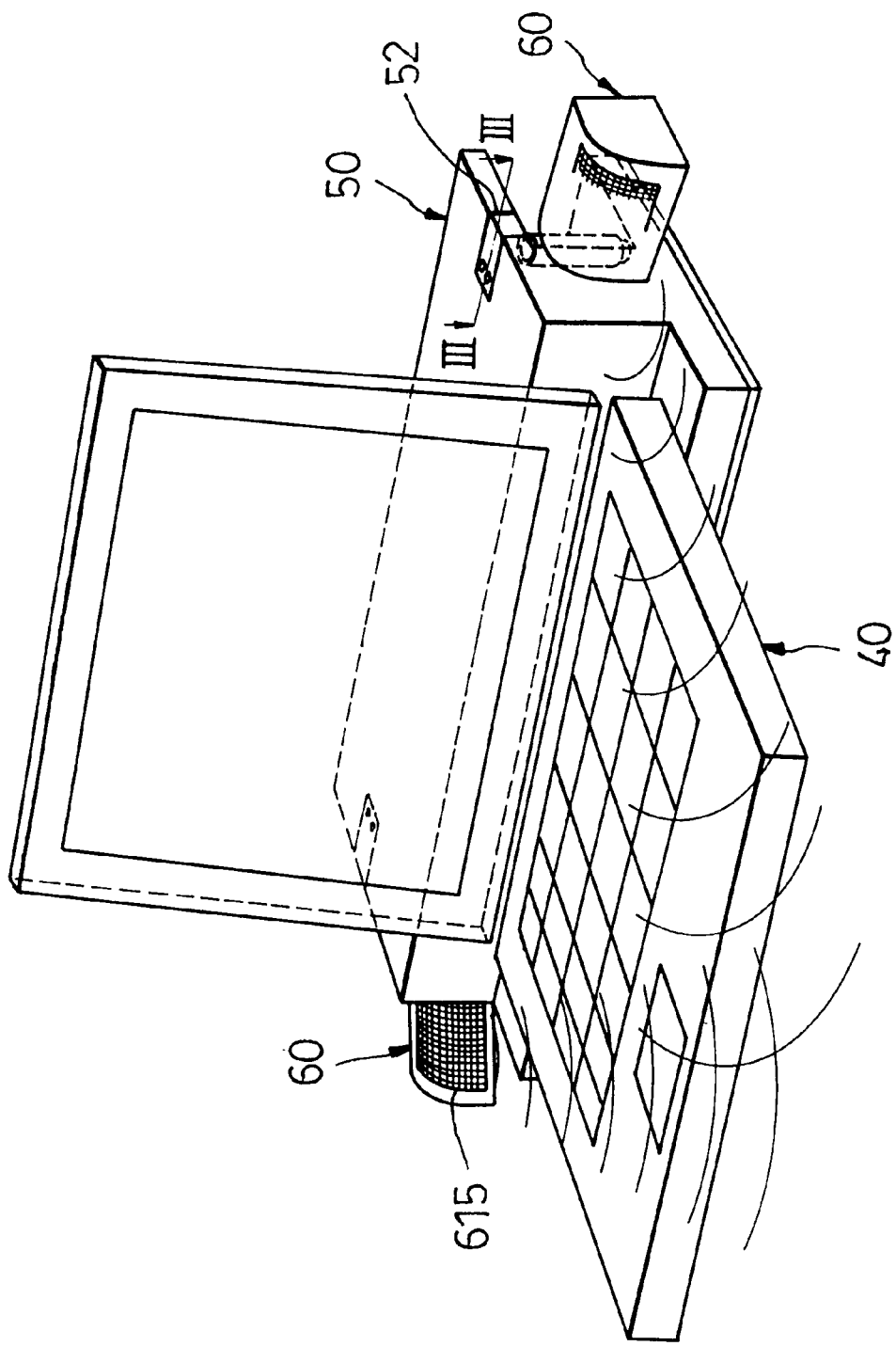
FIG. 4 illustrates the preferred embodiment of a docking base according to this invention on which a portable computer is mounted.

The docking base 50 includes a generally I-shaped hollow docking frame having an elongated horizontal portion 54 with left and right ends 54A, 54B, and an upright portion 57 which is disposed generally perpendicular to and which divides the horizontal portion 54 into a front section 55 to support the portable computer 40 thereon and a rear section 56 to support the bottom wall 613 of the speaker casings thereon. The upright portion 57 has front and rear walls 57A, 57B respectively adjacent to the front and rear sections 55, 56. The docking frame further includes means for pivotally coupling one of the lateral edge portions 611A of the speaker casings with the rear section 56 along an axis longitudinal to the upright portion 57 and proximate to one of the left and right ends 54A, 54B so as to turn the speaker casings about the longitudinal axis between a retracted position, where the back walls 611 of the speaker casings confront the rear wall 57B of the upright portion 57 (as illustrated by the dotted lines in FIG. 5), and to an extended position, where the lateral walls 612 of the speaker casings are exposed outwardly of a respective one of the left and right ends 54A, 54B to direct the sound outlet 615 to face frontward, as best shown in FIG. 4.

The docking frame further includes a top portion 58 which extends rearwardly from an upper end of the upright portion 57 parallel to the horizontal portion 54 to cover and define with the rear section 56 a chamber for accommodating the speaker units 60 when the latter are at the retracted position. The chamber opens laterally proximate to the left and right ends 54A, 54B and at a direction opposite to the rear wall 57B of the upright portion 57 to permit turning of the speaker casings about the longitudinal axis for movement to the extended position.

The top portion 58 has two lateral notches 52, each of which is provided a dented recess 53 proximate to one of the left and right ends 54A, 54B. Each of the recesses 53 has a bottom 531 disposed lower than the top surface of the top portion 58. The pivot means includes a pivot hole 56A formed in the rear section 56 proximate to a respective one of the left and right ends 54A, 54B, and an L-shaped pivot 70. The L-shaped pivot 70 has a connecting horizontal portion 71 mounted to the bottom 531 of the recess 53, and a distal portion 72 provided with a pin 721 which projects downwardly parallel to the longitudinal axis for passage into a pivot post 616 of the corresponding speaker casing.

Figure 6:
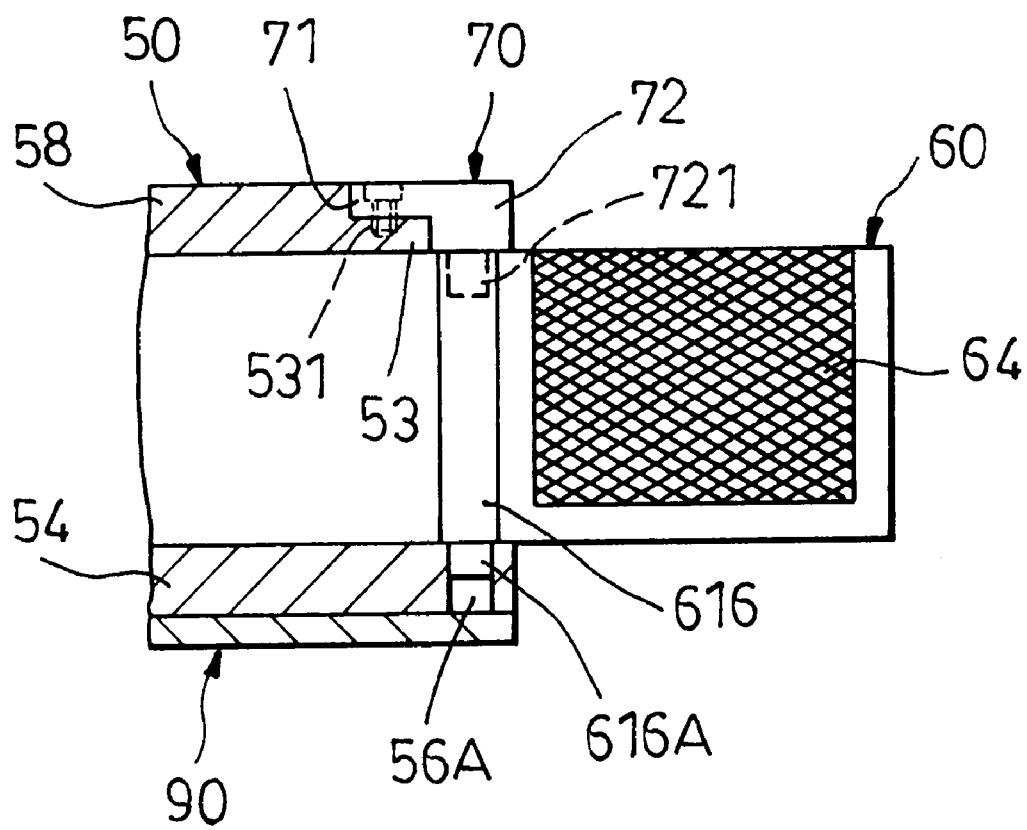
FIG. 6 is a partially cross sectional view of the preferred embodiment.
Figure 7:
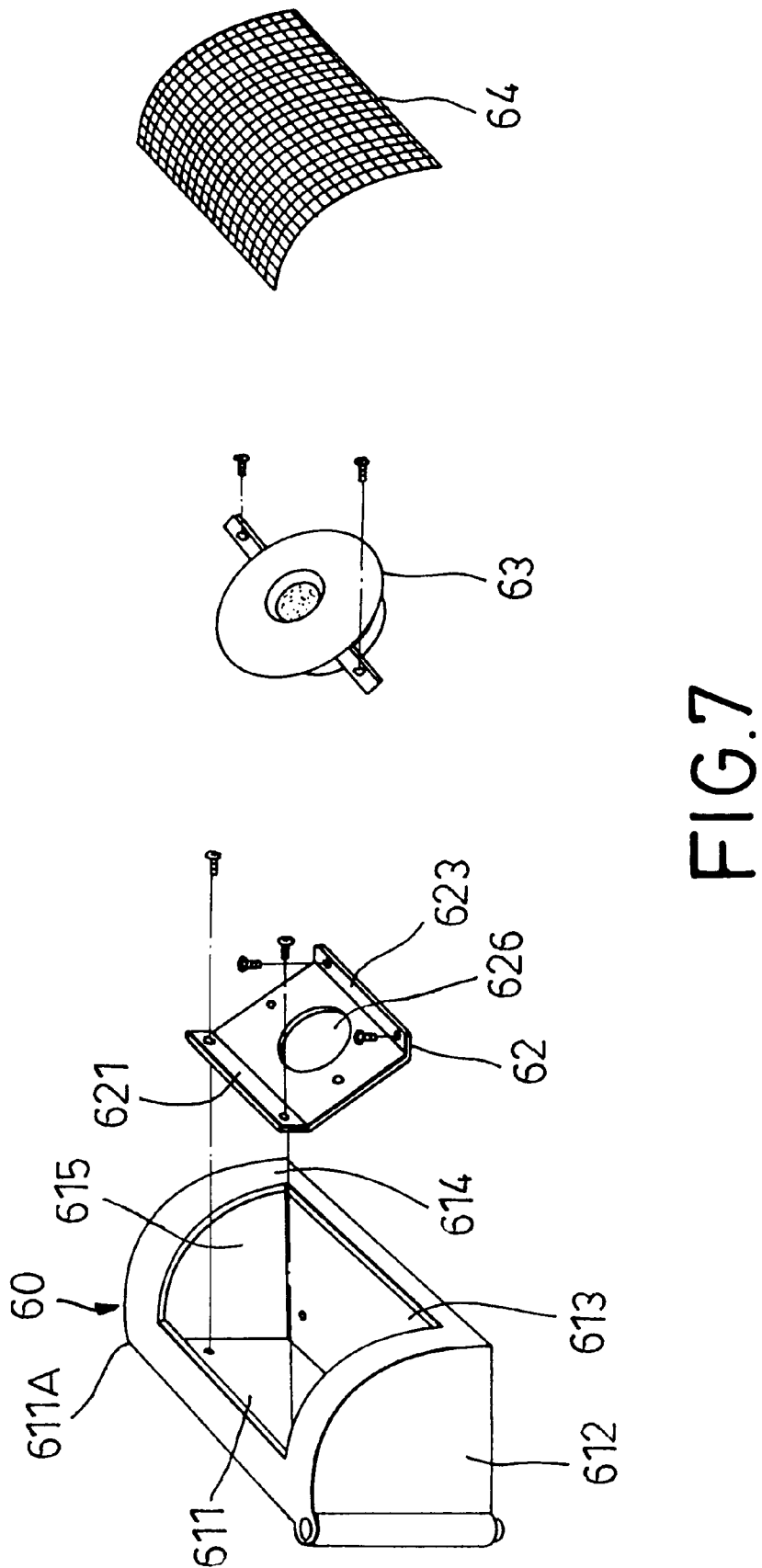
FIG. 7 is an exploded view of a speaker unit of the preferred embodiment.

In the preferred embodiment, the speaker casing has a lower stud 616A that is aligned with the pivot post 616 and that extends downward from the bottom wall 613 into a respective pivot hole 56A in the rear section 56 (see FIG. 6).

Referring again to FIG. 7, the speaker unit 60 further includes a mounting plate 62 which has upper and lower portions 621, 623 fixed to the back and bottom walls 611, 613 in an inclined manner, and a speaker 63 mounted in a mounting hole 626 of the mounting plate 62 such that the speaker 63 is generally inclined upward relative to the horizontal portion 54. The sound outlet 615 is preferably covered by a perforated plate 64.

Referring to FIG. 8, in use, the speaker casings can be turned about the pins 721 (see FIG. 6) so as to dispose the same in an extended position such that the sound outlets 615 face frontward in order to provide the optimum sound effect to the user 100. For storage, the speaker casings are moved to the retracted position (as shown by the dotted lines).

The docking base of this invention is generally molded as a hollow frame in order to reduce the total weight thereof. A metal plate 90 is mounted to the horizontal portion 54 to increase the weight of the docking base for enhanced stability.

As to how connectors (not shown) are installed on the docking base for connecting the portable computer 40 to computer peripheral devices (not shown), the techniques involved therein are not related to this invention and therefore shall be omitted herein.

With this invention thus explained, it is apparent that numerous modifications and variations can be made without departing from the scope and spirit of this invention. It is therefore intended that this invention be limited only as indicated in the appended claims.

I claim:

1. A docking base for docking a portable computer, said docking base including a speaker casing having a back wall, two opposed lateral walls extending respectively from two opposed lateral edge portions of said back wall, a bottom wall extending between said lateral walls, and a front wall which defines a sound outlet therethrough, said docking base comprising:

a docking frame, configured to be detachably connected to the portable computer, including an elongated horizontal portion with left and right ends, and an upright portion which is disposed generally perpendicular to and which divides said horizontal portion into a front section adapted to support the portable computer thereon and a rear section to support said bottom wall of said speaker casing thereon, said upright portion having front and rear walls respectively adjacent to said front and rear sections, said docking frame further including means for pivotally coupling one of said lateral edge portions of said speaker casing with said rear section along an axis longitudinal to said upright portion and proximate to one of said left and right ends so as to turn said speaker casing about said longitudinal axis between a retracted position where said back wall of said speaker casing confronts said rear wall of said upright portion, and an extended position where said lateral walls of said speaker casing are exposed outwardly of a respective one of said left and right ends to direct said sound outlet to face frontward.

2. The docking base as defined in claim 1, wherein said docking frame further includes a top portion which extends rearwardly from an upper end of said upright portion parallel to said horizontal portion to cover and define with said rear section a chamber for accommodating said speaker casing when said speaker casing is at said retracted position, said chamber opening laterally proximate to said left and right ends and at a direction opposite to said rear wall of said upright portion to permit turning of said speaker casing about said longitudinal axis for movement to said extended position.

3. The docking base as defined in claim 2, wherein said top portion has a lateral notch with a recess proximate to one of said left and right ends, said recess being disposed lower than top surface of said top portion, said pivot means including a pivot hole formed in said rear section proximate to said one of said left and right ends and an L-shaped pivot having a horizontal portion mounted to said recess and a pin projecting downwardly from said horizontal portion parallel to said longitudinal axis for passage through said speaker casing so as to be inserted into said pivot hole.

* * * * *